United States Patent [19]
Leger

[11] 4,168,034
[45] Sep. 18, 1979

[54] APPARATUS FOR RECYCLING NON-REUSEABLE WOODEN PACKING AND HANDLING UNITS CONTAINING PIECES OF FERROMAGNETIC METAL

[76] Inventor: Paul Leger, 16 Rue de Leningrad, 75008 Paris, France

[21] Appl. No.: 951,378

[22] Filed: Oct. 16, 1978

Related U.S. Application Data

[63] Continuation of Ser. No. 813,850, Jul. 8, 1977, abandoned.

[51] Int. Cl.² .............................................. B02C 23/00
[52] U.S. Cl. .................................... 241/76; 241/79.1; 241/80; 241/152 A
[58] Field of Search ..................... 241/24, 28, 29, 79.1, 241/80, 194, 152 R, 152 A, 76, 285 R

[56] References Cited

U.S. PATENT DOCUMENTS

| | | | |
|---|---|---|---|
| 904,908 | 11/1908 | Williams | 241/94 |
| 2,894,697 | 7/1959 | Panning et al. | 241/236 X |
| 3,823,881 | 7/1974 | Grob | 241/79.1 |
| 3,878,994 | 4/1975 | Tee | 241/28 X |

*Primary Examiner*—Richard B. Lazarus
*Attorney, Agent, or Firm*—Owen, Wickersham & Erickson

[57] ABSTRACT

Wooden packing and handling units containing pieces of ferromagnetic metal, such as nails and staples, are reduced so that the metal pieces embedded in the constituent wooden portions are detached, the pieces of metal are extracted from the reduced wooden portions, preferably magnetically, and the reduced wooden portions disencumbered of the metal pieces are subjected to granulometric sorting, i.e., sorting by size. The method is carried out using a percussion crushing station, a magnetic extraction station, and a granulometric double-cut screening station.

1 Claim, 4 Drawing Figures

APPARATUS FOR RECYCLING NON-REUSEABLE WOODEN PACKING AND HANDLING UNITS CONTAINING PIECES OF FERROMAGNETIC METAL

This is a continuation of application Ser. No. 813,850, filed July 8, 1977, now abandoned.

The present invention refers to a method of recycling non-reuseable wooden packing and handling units containing pieces of ferromagnetic metal, in particular crates, small cages, baskets, trays, boxes, wickerwork, employed especially for packing and transport of fruit and vegetables, as well as pallets and other packing and handling units formed of pieces of wood assembled by means of nails, staples or similar iron parts. The invention likewise refers to a device for putting this method into effect, as well as the product obtained by recycling these packing and handling units.

It is well known that for some time the furnishing of the paper industry with raw material for the manufacture of paper pulp has posed considerable problems. In fact the permanent increase in the consumption of paper is at present bringing about the exploitation of woodland at a rate higher than the rate of reforestation, which makes foreseeable an impending scarcity of raw material for the manufacture of paper pulp.

In another connection considerable quantities of wooden packing and handling unit are at the present time thrown away after use. The only solution for recovery envisaged hitherto consists in burning them, for example, in boiler rooms. In fact the problem which any other recovery of these packing and handling units poses lies in the presence of pieces of metal such as nails, staples or similar parts employed for assembling the different pieces of wood of such units and embedded in the said pieces.

Recycling of wood refuse containing no metal pieces has already been envisaged with success. By crushing it is possible to reduce this wood refuse, for example, sawmill scraps, into little fragments of wood capable of being employed, for example, as raw material for the manufacture of paper pulp.

The object of the present invention is a method and a device for recycling non-reuseable wooden packing and handling units containing pieces of ferromagnetic metal, so as to recover a material absolutely free from pieces of metal, which may be used as raw material, for example, for the manufacture of paper pulp.

The object of the invention is likewise a device ensuring the recycling of such packing and handling units by reduction of these units into fragments of uniform size and by elimination of all the pieces of metal.

Finally, the object of the invention is the obtaining from packing and handling units of the type described above, of a product which is perfectly suitable as, for example, raw material for the manufacture of paper pulp.

The method in accordance with the invention consists in the fact that the packing or handling units are reduced so that the pieces of metal embedded in the wooden portions in the units are detached, that the pieces of metal are extracted from the reduced wooden portions and that the reduced wooden portions disencumbered of the pieces of metal are subjected to granulometric sorting, i.e., sorting by size.

Preferably one proceeds with the reduction of the packing units by coarse chipping followed by crushing. That offers as compared with simple crushing, the advantage that the appliance employed for the crushing may be fed with packing and handling units already partially reduced in an appliance designed especially to be able to process large volumes of material. That is, the packing units mentioned occupy in particular a very large volume for a low weight, which might present difficulties in feeding directly to a crusher.

Extraction of the pieces of metal from the fragments of wood obtained by reduction of the packing and handling units is carried out preferably magnetically.

The sorting of the reduced fragments of wood consists advantageously of what is known as double-cut sorting, enabling separation from the fragments the grain size of which lies within a certain band both the larger fragments and the smaller fragments.

According to a preferred form of the method in accordance with the invention the crushing, the magnetic extraction of the pieces of metal (removal of iron) as well as the screening is carried out in a closed circuit, the too large fragments of wood rejected in the screening being returned to the crushing in order to undergo another cycle of crushing, magnetic removal of iron and screening.

The device for putting this method into effect comprises a percussion crushing station, preferably with a flail crusher, a station for magnetic removal of iron and a granulometric, preferably double-cut, screening station.

According to an advantageous embodiment the crusher is preceded by a chipper which produces a first reduction of the packing and handling units, which enables uniform feeding of the crusher.

The feeding of this chipper with packing and handling units is ensured preferably by a hoper executed so as to eliminate the risk of formation of vaults, namely, a hopper two adjacent sides of which are vertical and the other two sides of which are sloping.

The system of removal of iron advantageously comprises a conveyor belt the guide roller of which located at the discharge end is a magnetic drum, the upper side of this belt being surmounted by a second belt transverse to the first, the lower side of which lies a short distance from the upper side of the first belt and here passes underneath a magnet. Thus the second belt with its magnet pulls out upwards the pieces of metal lying in the upper portion of the layer of crushed material being conveyed by the first belt, whilst the magnetic drum at the discharge end of this first belt pulls out the pieces of metal located in the lower portion of this same layer of material.

According to an advantageous embodiment of the device in accordance with the invention the screening station comprises a double-cut vibrating screen including two superimposed sloping screening surfaces, the upper screening surface having meshes which retain the too large fragments and the lower screening surface having meshes which let the too small fragments pass through, the fragments to be screened being fed onto the upper screening surface. The outlet from the screen which receives the fragments retained by the upper screening surface opens out onto a conveyor belt running from the chipper to the crusher, so that the said too large fragments find themselves returned into the crusher, thus carrying out a new cycle of crushing, removal of iron, and screening.

Referring to the attached drawing a non-restrictive embodiment will be described below in greater detail, of a device for the putting into effect of the method in accordance with the invention; in this drawing.

Figure 1:
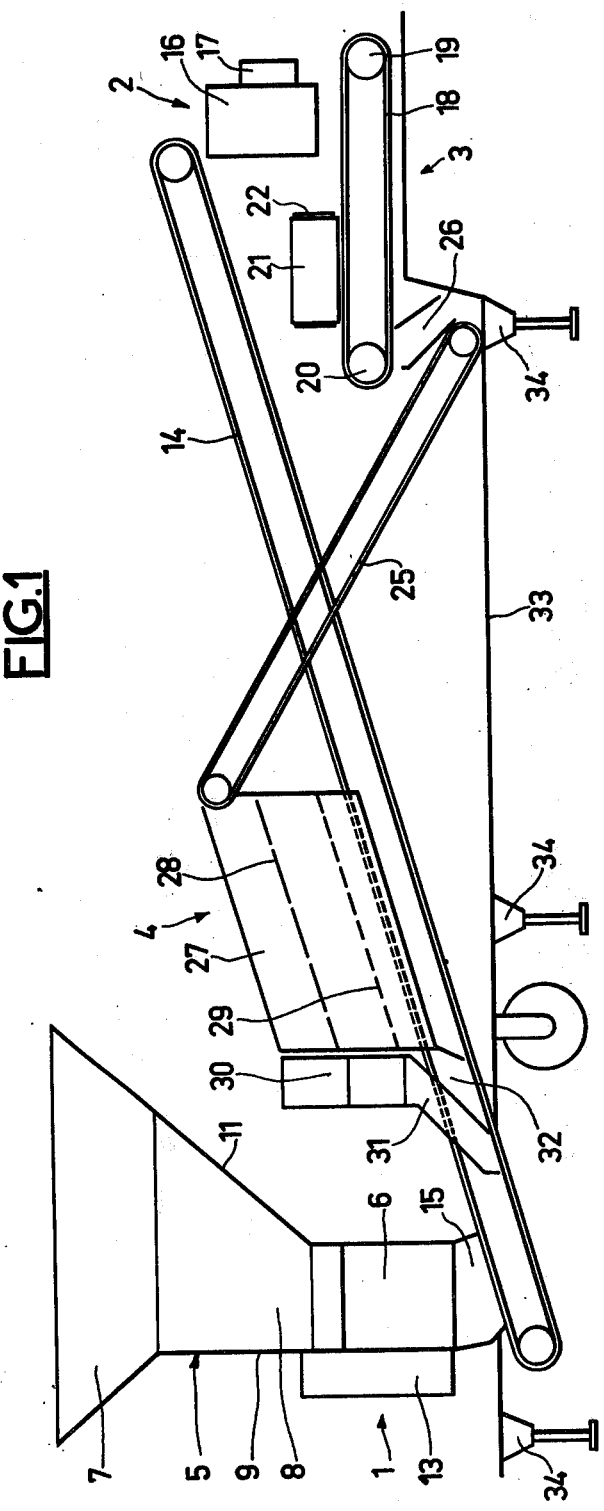
FIG. 1 is a side elevation of a device in accordance with the invention.
Figure 2:
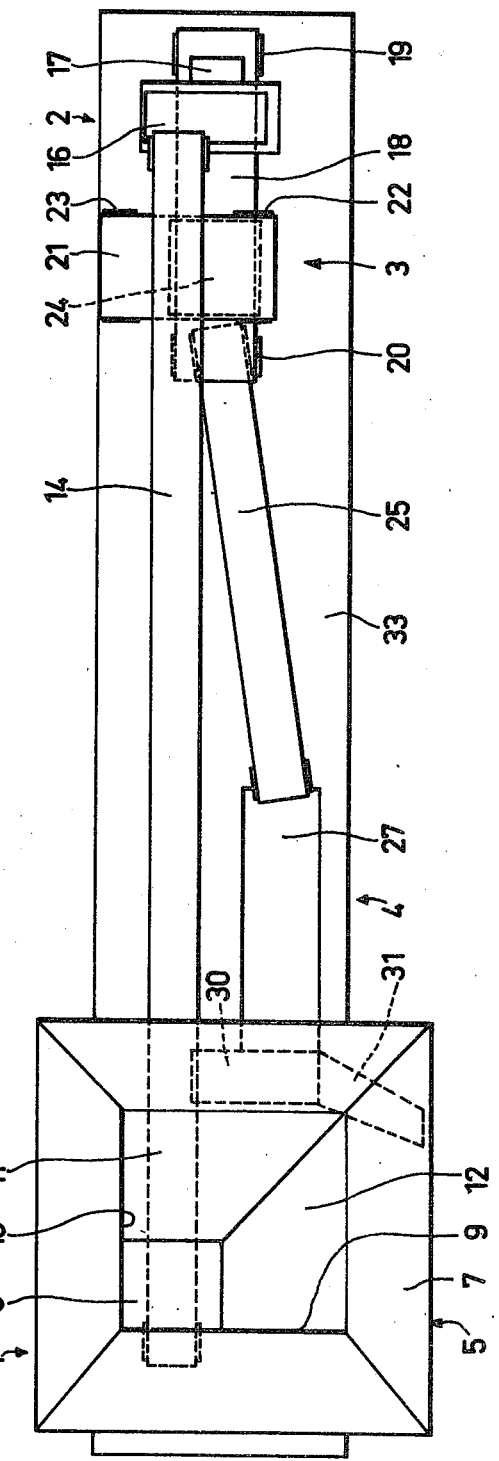
FIG. 2 is a plan of this same device.
Figure 3:
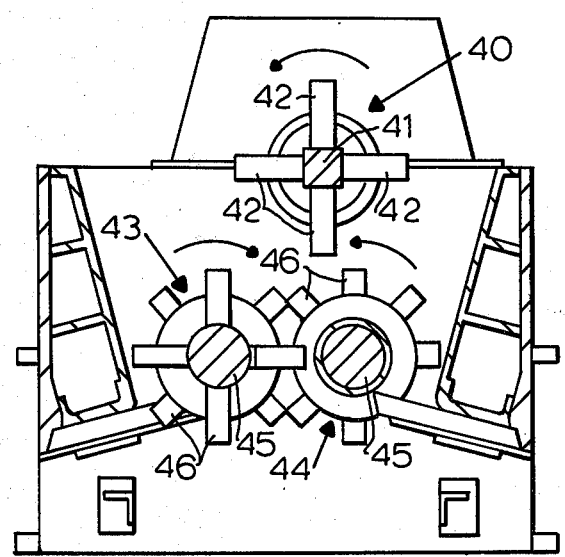
FIG. 3 is an enlarged view in elevation and in section of the extractor-chipper.
Figure 4:
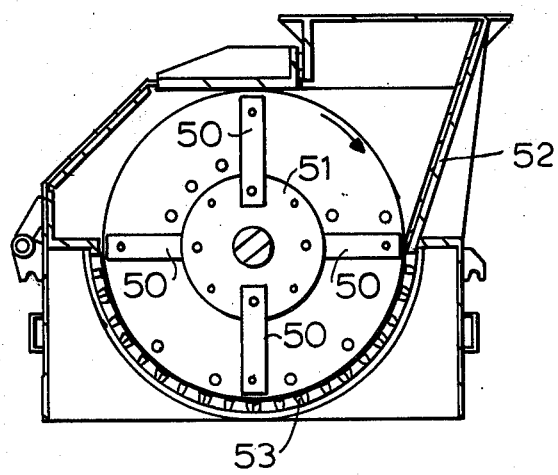
FIG. 4 is an enlarged view in elevation and in section of the crusher.

The device as illustrated by the drawing is used for recycling non-reuseable wooden packing and handling units containing ferromagnetic pieces, for example, crates or other containers for packing and transport of fruit and vegetables and pallets and other handling units assembled by means of nails or staples.

This device comprises four main parts, namely, a feeding station 1, a crushing station 2, an iron-removal station 3 and a screening station 4.

The feeding station 1 comprises a hopper 5 opening into an extractor-chipper 6. The hopper 5 is composed of a top portion 7, preferably detachable, and a bottom portion 8 directly on top of the feed opening to the extractor-chipper 6. The top portion 7 exhibits the shape of a frustum of a regular pyramid of square base. The bottom portion 8 exhibits on the contrary two adjacent sides 9, 10 which are vertical, whilst the other two sides 11, 12 are sloping, preferably at the same angle as the four sides of the top portion 7 of the hopper.

The extractor-chipper 6 the driving mechanism (motor, gear) of which is outlined at 13 preferably comprises an extractor member 40, for example, a cross-shaft 41 fitted with radial arms 42. Underneath this extractor member 40 are arranged preferably two chipper members 43, 44 which cooperate with one another and consist, for example, each of a cross-shaft 45 fitted with radial teeth 46. The teeth 46 of these two shafts 45 lie in a number of offset planes and have a length such that the two toothed shafts 45 "mesh" with one another, that is to say, their teeth interpenetrate.

A sloping conveyor belt 14 connects the outlet 15 from the extractor-chipper 6 to the crushing station 2. The latter comprises a crusher 16 with its driving mechanism 17. The crusher 16 which is fed directly with chips by the belt 14 consists preferably of a flail crusher, that is to say, a crusher including a number of rows of long light hammers 50 hinged to a shaft 51 revolving at high speed. The products introduced into the crusher are flung by the flails against impact-plates 52 and leave the crusher through a grid 53.

The outlet from the crusher 16 opens out directly onto a horizontal conveyor belt 18 to the iron-removal station 3. The belt 18 which consists of a non-magnetic material, for example, rubber, passes round two guide pulleys 19, 20. The guide pulley 20 located at the discharge end of the belt 18 consists of a magnetic drum 55 magnetized so as to emit a magnetic flux all round its periphery. A short distance above the top side of the belt 18 another horizontal conveyor belt 21 is installed, of non-magnetic material and extending perpendicularly to the belt 18. The bottom side of the belt 21 between the two guide pulleys 22, 23 passes underneath a magnet 24 the length of which, taken in the direction longitudinal to the belt 21, is greater than the width of the belt 18.

Underneath the dischage end of the belt 18 is a sloping conveyor belt 25 which connects the iron-removal station 3 to the screening station 4. In addition there is provided at this point an outlet channel 26 for receiving the ferromagnetic pieces held against the drum 20 whilst the non-magnetic portions are spread on the belt 25.

The screening station 4 comprises a double-cut vibrating screen 27. This double cut is ensured by two superimposed screening surfaces 28, 29. The upper screening surface 28 onto which the products conveyed by the belt 25 are discharged exhibits larger meshes than the lower screening surface 29. The meshes of the screening surfaces 28 and 29 are chosen so that the screening surface 28 retains the too large fragments and the meshes of the screening surface 29 are chosen so that they let the fragments pass through, which are too small with respect to the grain size sought. The fragments having this grain size are therefore retained on the lower screening surface 29. The upper screening surface 28 may have square meshes, for example, of 16 mm or of 20 mm. The lower surface 29 may have square meshes of 2 mm or 3.15 mm on each side. The screening surfaces 28 and 29 are sloping and are followed at their lowest point, each by a vibrating chute 30, 31. The vibrating chute 30 which receives the too large fragments leads to over the conveyor belt 14, whilst the chute 31 which receives the products having the grain size sought ensures the discharge of the latter. Finally the too small fragments which have passed through the lower screening surface 29 leave the screen 27 by a channel 32.

It may be seen in the drawing that the whole of the device is mounted on a semi-trailer frame 33 which at rest may be levelled by means of jacks 34.

Operation of the device as shown on the drawing will now be described.

The packing or handling units, for example, crates or pallets are loaded into the hopper 5. Thanks to the special shape of the bottom portion 8 of this hopper with twice two opposite walls, one of which is sloping and the other vertical, these bulky packing units drop in the hopper without formation of any vault. Of course the outlet area of the hopper 5 must be substantially larger than the size of the crates or pallets to be processed so that a crate and a pallet cannot wedge in it by getting crosswise.

The extractor-chipper 6 ensures on the one hand the extraction of the packing and handling units through the outlet area of the hopper 5 and on the other hand a first reduction of these units. The bits resulting from this first reduction are much less bulky and much more compact than the packing units whole, which enables more uniform and faster feeding by an ordinary conveyor belt 14, of the crusher station 2.

At the crusher station 2 these coarsely reduced bits are crushed by percussion in the flail crusher 16. In the latter the bits of wood proceeding from the first reduction of the packing units in the extractor-chipper 6 are reduced to the point where the maximum size of the fragments leaving the crusher is substantially equal to the upper limit of grain size of the product to be achieved. Thanks to the particular method of disintegration by percussion in such a crusher the bits of wood introduced break up in a preferential fashion through the holes from the nails or staples for assembly of the packing units, which has the effect that these nails or staples become detached from the fragments of wood. The fragments of wood and the nails or staples having passed through the outlet grid from the crusher 16 fall onto the belt conveyor 18 which makes them pass underneath the belt 21. Under the action of the magnet 24 the nails and staples lying in the upper layer of product on the belt 18 are extracted upwards from this layer and stick to the belt 21 to be conveyed thus by the latter beyond the side edge of the belt 18 as far as the end of the magnet 24, where these nails and staples fall into a channel (not shown).

At the discharge end of the belt 18 the fragments of wood are spread onto the belt 25, whilst the nails and staples lying in the lower portion of the layer of product on the belt 18 are attracted through the latter by the magnetic drum 20 and follow the latter round to the place where the bottom side of the belt 18 leaves the drum 20. At this instant the nails and staples are no longer subjected to the action of the magnetic field from the drum 20 and fall by gravity into the channel 26.

This iron-removal station ensures 100% extraction of the nails and staples detached from the fragments of wood. If a nail or a staple not detached from a fragment of wood left the crusher 16 in spite of everything, this nail or staple would be extracted at the iron-removal station 3 with its fragment of wood if the latter were small or would not be extracted with its fragment of wood if the latter were large. In the latter case the fragment of wood with the nail or staple would reach the conveyor 25 along with the fragments of wood which had been disencumbered of any ferromagnetic pieces.

At the screening station 4 the vibrating screen 27 fed by the conveyor belt 25 ensures by its two superimposed screening surfaces 28 and 29 having meshes of different sizes that the fragments of wood larger than the upper limit of grain size for the product sought return by the chute 30 onto the conveyor 14, whence they are returned to the circuit of crushing, removal of iron, and screening. All the smaller fragments pass through the screening surface 28 and fall onto the screening surface 29 which retains all the fragments of wood the size of which lies between the upper limit and the lower limit of grain size of the product sought. These fragments which constitute the product sought are discharged through the chute 31.

All the too small fragments which pass through the screening surface 29 are recovered on the bottom of the screen 27 whence they leave through the discharge channel 32.

It is advisable to harmonize the characteristics of the iron-removal station 3 with the size of the meshes of the upper screening surface 28 of the screen 27, that is to say, to the upper limit of grain size of the product sought, so that all the fragments of wood containing a nail or a staple and the size of which is equal to or less than the upper limit of grain size are compulsorily extracted by the magnet 24 or the magnetic drum 20. On the other hand, the fragments of wood containing a nail or a staple and having a size greater than the aforesaid upper limit of grain size do not all have to be extracted at the iron-removal station since they will be at the screening station 4 by the upper screening surface 28.

The combination of the hopper as described above, the extractor-chipper, the crusher, the double iron-removal device and the double-cut screen enables non-returnable packing and handling units to be recycled with high efficiency with a view to obtaining a product consisting of fragments of wood which are 100% disencumbered of the nails, staples and other ferromagnetic pieces embedded in the units and the size of which lies within a predetermined band of grain size. This product which may if necessary be dried and compacted constitutes an excellent raw material for the manufacture of paper pulp. The smaller fragments of wood the proportion of which is very low with respect to that of the fragments of wood lying between the predetermined limits of grain size may be employed, for example, as raw material for the manufacture of compressed board.

The following examples of screens, sizes, and product sizes are illustrative:

EXAMPLE 1

A screen having an upper surface 28 wih meshes 20 mm square and a lower surface 29 with meshes 3.15 mm square was used with the invention. The products which were larger than 20 mm were therefore retained on the screen 28 for reprocessing. The product sought had grain sizes small enough to pass through the 20 mm square mesh and larger than would pass through the lower meshes 3.15 mm across. 85% of the product was found to be within this size as the minimum during operation of a device embodying the invention while the by-product was at the maximum 15%, this being the portion that passed on through the lower screen 29.

EXAMPLE 2

In another instance, the upper screen 28 had square meshes 16 mm on a side, while the lower surface 29 again had square meshes 3.15 mm on a side. In this instance the by-product passing through the lower screen 29 was at a maximum 19% of the product which passed through the upper screen 28. The product sought was 81% at a minimum. The portion retained by the upper screen was reprocessed until it passed through the upper screen 28.

EXAMPLE 3

The upper screen of Example 1 with 20 mm square meshes was used in combination with a lower screen having square meshes 2 mm on the side. In processing the machine, at least 87% of the sought-for product was obtained, being retained by the lower screen 29, with the by-product that passed through the lower screen being about 13% at the most.

EXAMPLE 4

The upper screen 28 with 16 mm square meshes was used in combination with a lower screen 29 having 2 mm square meshes. In this instance, the sought-for product was obtained as at least 83% of the material falling through the upper screen 28 with a by-product no more than 17% falling through the lower screen 29.

The product sought for all four examples was found to be suitable raw material for the manufacture of paper pulp.

It goes without saying that without departing from the scope of the invention numerous modifications and variants may be applied to the device as described above. Thus it may be installed at a fixed station instead of being mounted on a semi-trailer. The mutual arrangement of the different stations and their connection by belts may be modified as needed.

The band of grain size within which lies the major portion of the fragments of wood obtained by reduction of the packing or handling units is adjustable by changing the grid on the crusher and the screening surfaces so that it corresponds with the standards demanded by the paper industry for the manufacture of mechanical, semi-chemical and thermomechanical pulps. The drying which is carried out preferably by hot air enables a product to be obtained which has a controlled degree of dryness lying between about 70 and 75%.

Finally it would be well to observe that the device as described above equally well enables recycling of cartons containing pieces of metal, for example, staples.

I claim:

1. A portable self-contained device for recycling non-reusable wooden packing and handling units such as boxes and pallets containing pieces of ferromagnetic metal such as nails and staples embedded therein, in order to obtain wood fragments absolutely free from said pieces of ferromagnetic metal and having a size contained within a predetermined range of sizes, comprising:

- a feeding and chipping station including a hopper receiving said packing and handling units and an extractor-chipper fed by said hopper and having an upper rotating extractor shaft with radial arms and two lower parallel chipper shafts rotating in opposite directions and carrying radial teeth in offset transverse planes, so that the teeth of the said lower shafts intermesh, said extractor-chipper also having an outlet,
- a percussion crusher comprising an inlet, flails hinged on a rotating shaft, impact plates, and an outlet grid,
- a first belt conveyor extending from the outlet of said extractor-chipper to the inlet of said percussion crusher,
- a second belt conveyor receiving the crushed material from the outlet grid of said percussion crusher and having at a discharge end a magnetic drum serving as a belt pulley drum,
- a third belt conveyor transverse to the said second belt conveyor, the lower run of said belt conveyor being located a short distance above the upper run of said second belt conveyor and having a length which taken in the direction of said third belt conveyor is greater than the width of said second belt conveyor,
- a magnet above said third belt conveyor and exerting magnetic force to pull magnetic pieces upwardly from said second belt conveyor to the bottom of said lower run of said third belt conveyor, thereby to convey said magnetic pieces out beyond the sides of said second belt conveyor and drop them off beyond said second belt conveyor.
- a double-cut screen fed by said second belt conveyor, having two superposed inclined screening surfaces, the upper of said screening surfaces having meshes whose size corresponds to the said upper limit of said range of sizes and the lower of said screeming surfaces having meshes whose size corresponds to the said lower limit of said range of sizes,
- a fourth conveyor receiving, at the outlet of said screen, the wood fragments disencumbered or not of said pieces of metal, whose size is larger than the said upper limit and which have been retained by said upper screeming surface, said fourth conveyor discharging said fragments on said first belt conveyor, in order to return said fragments into said percussion crusher, and
- a portable main frame supporting all of said feeding and chipping station, said crusher, said conveyors, said magnet, and said screen.

* * * * *